March 13, 1956 E. H. RAND 2,738,199
MECHANICAL ANIMAL

Filed Nov. 5, 1953 3 Sheets-Sheet 1

INVENTOR
Edwin H. Rand
BY Mason, Fenwick & Lawrence
ATTORNEYS

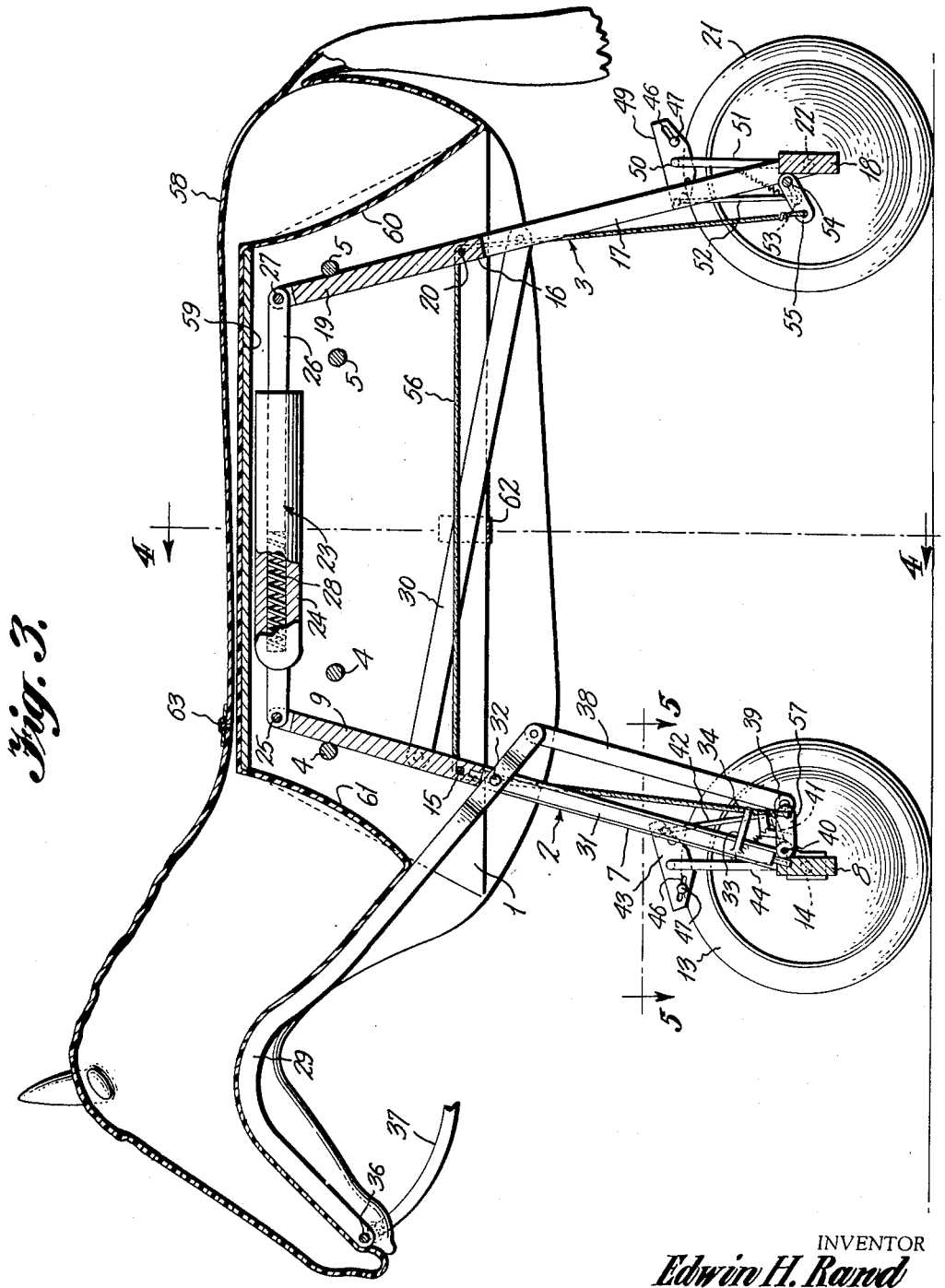

March 13, 1956  E. H. RAND  2,738,199
MECHANICAL ANIMAL
Filed Nov. 5, 1953  3 Sheets-Sheet 3
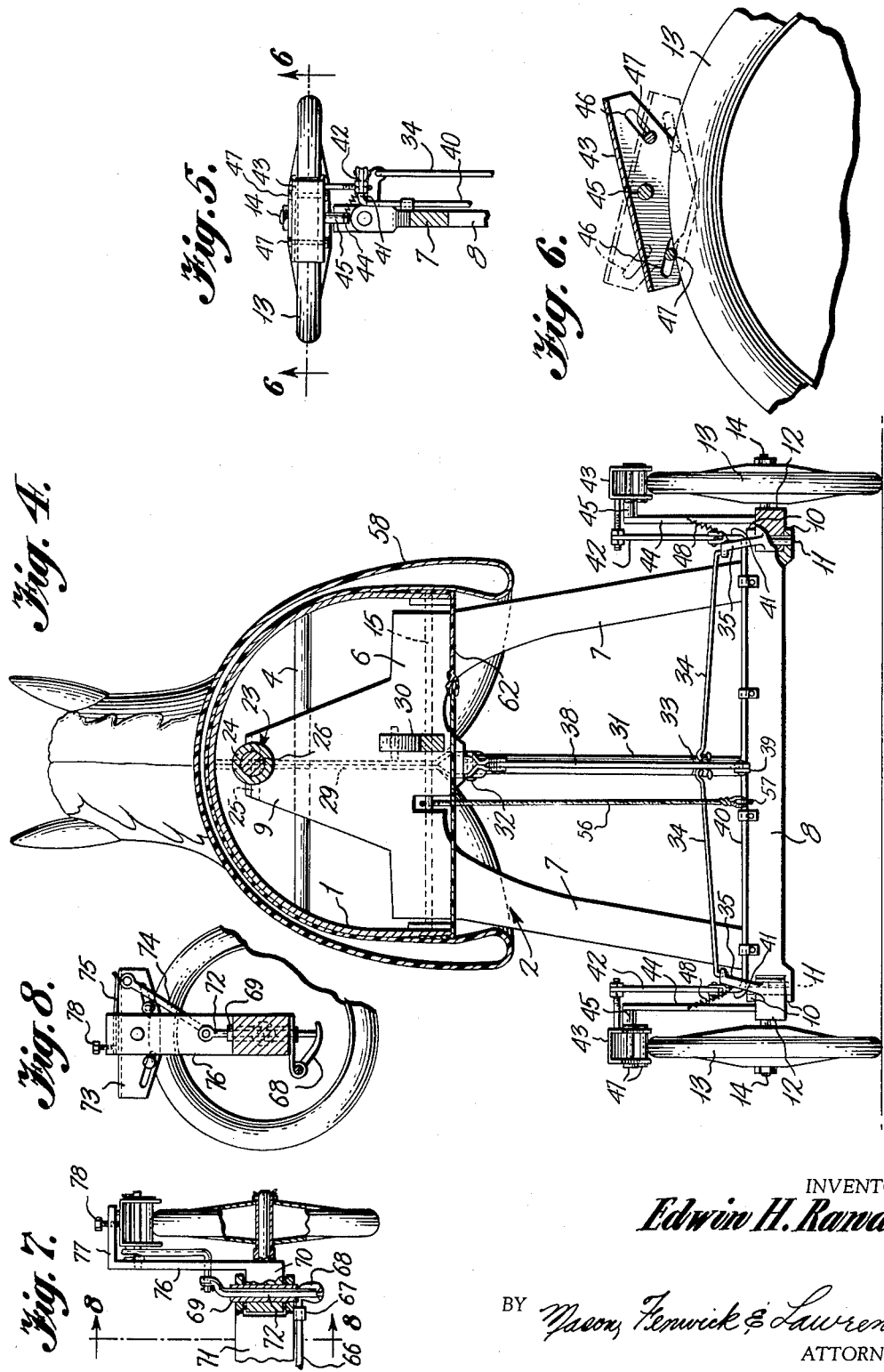
INVENTOR
*Edwin H. Rand*
BY *Mason, Fenwick & Lawrence*
ATTORNEYS

# United States Patent Office 2,738,199
Patented Mar. 13, 1956

2,738,199

MECHANICAL ANIMAL

Edwin H. Rand, Magnolia, Mass.

Application November 5, 1953, Serial No. 390,297

9 Claims. (Cl. 280—1.182)

This invention relates to mechanical animals of the type which can be mounted by a rider and caused to move progressively over the ground in a motion simulating the walking or running movement of the animal.

Mechanical animals of this general nature have been proposed, but for various reasons these have not proven entirely satisfactory. They have lacked adequate means for controlling the device when in motion and, therefore, many of the interest-adding factors of reality were not present and the devices were limited in their use.

The principal object of the present invention is to provide a mechanical horse, or other animal, which may be caused to move forwardly by movement of the rider, to turn to the right or left, to stop, or to move backwardly at the will of the rider.

A further object is to provide a device of this nature wherein a foundation, or basic member is provided to support the operating mechanism and this is covered by a removable, inflatable body representing an animal.

A more specific object of the invention is to provide such a device which has an improved braking device which is shiftable to permit the device to move in either direction or to stop movement in either direction.

Another object is the provision of such a device in which the operating mechanism is simplified and improved, resulting in easier operation with less effort on the part of the operator.

Other objects of the invention will become apparent from the following description of one practical embodiment thereof, when taken in conjunction with the drawings which accompany, and form part of, this specification.

In the drawings:

Figure 3 is a vertical longitudinal section view taken along the line 3—3 of Figure 2;

Figure 4 is a vertical transverse view taken along line 4—4 of Figure 3;

Figure 5 is a horizontal sectional view taken along line 5—5 of Figure 3;

Figure 6 is an enlarged sectional view taken along line 6—6 of Figure 5;

Figure 7 is a fragmentary view illustrating a slightly different operating mechanism for the front wheel brakes; and Figure 8 is a vertical section taken on the line 8—8 of Figure 7.

Figure 1:
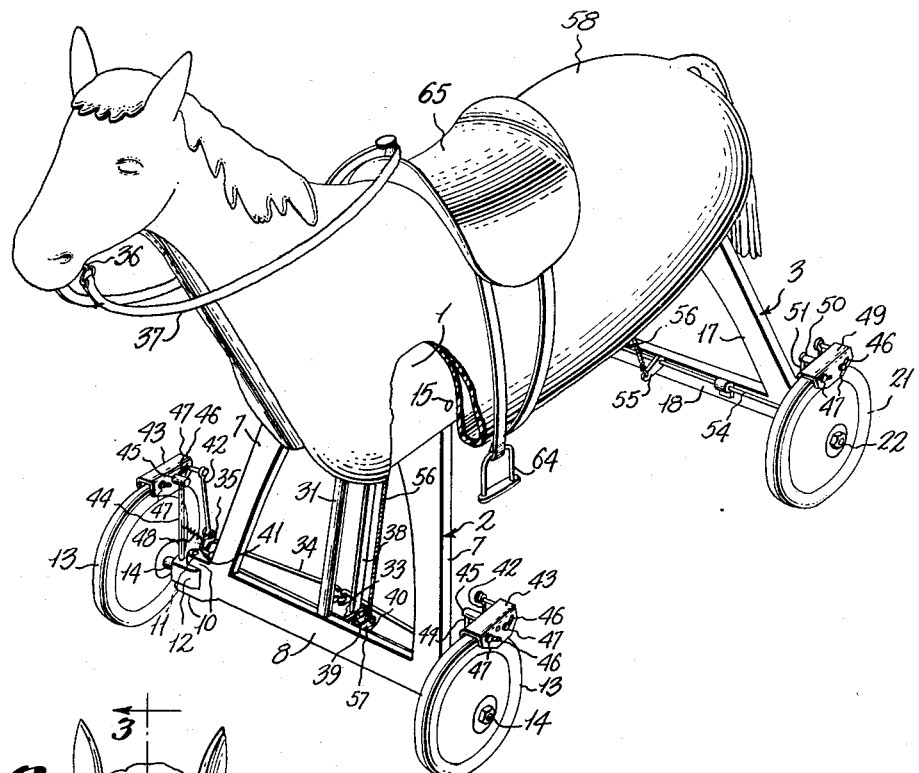
Figure 1 is a perspective view.
Figure 2:
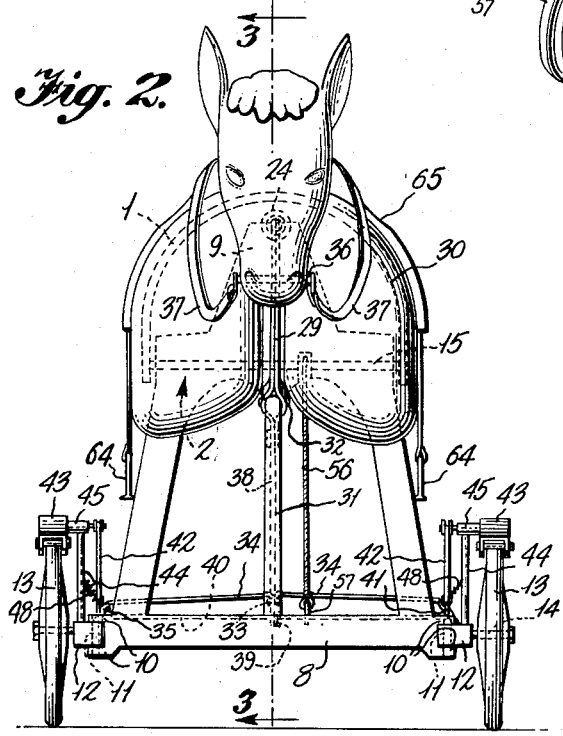
Figure 2 is the front elevation.

In general, the invention consists of an animal figure having movable legs and head which can be caused to move forward or backward by movement of a rider, and steered by movement of the head, with all motion and direction of motion being controlled by movable brake mechanisms operated by movement of the head portion of the device. Essentially it consists of two parts, a sturdy foundation carrying the mechanical elements and an inflatable body of desired design which is removable from the foundation so that bodies representing various animals may be used at will.

Referring to the drawings in detail, the basic mechanical element of the device includes a body foundation 1, front legs 2 and hind legs 3. The body foundation may be of any desired form and is shown as semi-cylindrical and positioned with its open side downwardly. It is bridged near its ends by suitable braces 4 and 5 which make the foundation shape-retaining and also serve as stops to limit the movement of the legs, as will be described.

The front legs are shown as comprising an intermediate bridge member 6 from the ends of which the legs 7 depend. The bottoms of the legs are spaced apart and rigidly tied together by means of the cross member 8. A lever 9 projects upwardly from the intermediate bridge member 6 and forms part of the operating mechanism for the legs. The lower ends of the legs are provided with horizontally projecting and vertically spaced ears 10 to receive king pins 11 which connect steering knuckles 12 to the bottoms of the legs. Wheels 13 are mounted upon the spindles 14 projecting from the steering knuckles. The front legs are pivotally connected to the body foundation by means of a pivot pin 15 which passes through the opposed sides of the body foundation and the intermediate bridge member 6 of the front leg structure.

The hind leg structure is very similar to that of the front legs and consists of an intermediate bridge member 16, hind legs 17 projecting downwardly from the bridge member and the lower cross member 18 which connects the bottoms of the legs. A lever 19 projects upwardly from the intermediate bridge member. The hind leg structure is also pivotally connected to the body foundation by means of a pivot pin 20 which passes through the body foundation and the intermediate bridge member 16. As it is unnecessary to provide steering movement for the wheels of the hind leg structure, these wheels 21 are mounted upon spindles 22 which project from the ends of the lower cross member 18.

The front and hind leg structures are connected together by a telescopic connection 23 which has its ends connected to the free ends of the levers 9 and 19 of the respective front and hind leg structures. This connection consists of a yoke, or tube, 24 pivotally connected to the end of lever 9, as at 25, and a rod 26 pivotally connected to the free end of lever 19, as at 27, and slidable in the yoke. A resilient member, such as the coiled spring 28, is interposed between the yoke and the rod to normally urge the telescopic connection to elongate. This movement of the joint is limited by the contact of the levers 9 and 19 with the cross braces 4 and 5 which extend across the body foundation. In inoperative position the levers will be resting against these brace members. The brace rods are so positioned with respect to the pivot pins 15 and 20 that the legs will never assume a vertical position but will remain inclined and diverging from one another. Due to this arrangement any sudden imposition of weight upon the body foundation will cause the legs to spread farther apart against the tension of the spring 28 and when this weight is removed, the spring will draw the legs together until the levers strike their respective stops. It will be obvious that resilient means other than the precise telescopic connection described, such as extension springs of metal, rubber or other suitable material, may be used. It is necessary only that a resilient member be incorporated to bias the legs toward spread position, as shown in Figure 3.

An equalizer bar 30, having its ends connected to the respective legs at points equidistant above and below their pivot points, may be used.

In order to turn the front wheels for steering, and to control the rotative movement of both the front and rear wheels, an actuating lever is provided which takes the form of a head and neck support 29. This lever is bent to appropriate shape to fit within the neck and head portions of an inflatable plastic cover which has a shape to conform to the body, neck and head of a horse, or other animal, and is connected to, and covers the body foundation 1. The rear end of the support lever 29 is bifurcated to surround a steering post 31 rotatably mounted in the intermediate bridge member 6 and the bottom cross member 8. The support lever is pivotally connected to the steering post by means of the pivot pin 32 so that the control lever may be moved vertically. The steering post is provided with a lever arm 33 near its bottom which has its outer end connected to a tie rod 34 extending between the steering arms 35 of the steering knuckles 12. The forward end of the support lever 29 has laterally projecting portions which form a bit 36 to which a bridle 37 is connected at the mouth of the animal. It will be obvious that a pull in either direction upon the bridle will cause the support lever to move to one side, rotating the steering post 31 which will cause the lever arm 33 to move, shifting the tie rod 34 and changing the direction of the front wheels.

The bifurcated portion of the support lever 29 extends rearwardly beyond the steering post and is connected to one end of a link 38 which has its opposite end pivotally connected to an arm 39 which projects rearwardly from a transverse shaft 40 mounted for rotative movement at the rear of the lower cross member 8. Shaft 40 is also provided with crank arms 41 at its ends, which arms serve to shift the brake mechanism by means of rods 42 which are connected to channel members 43 in which the brake mechanisms are mounted. Channels 43 are mounted upon the upper ends of support arms 44 which project vertically from the steering knuckles 12. The channels are pivotally connected to these arms by means of pivot pins 45 which pass through the channels midway between their ends. This supports channels 43 above the wheels so that they may be tilted either forwardly or rearwardly.

Each channel member is slightly wider than the tires of the wheel with which it cooperates and is mounted in such position that its side plates project downwardly beyond the periphery of the wheel, with the side plates of the channel straddling the wheel. The side plates are provided with slots 46 on either side of the center of the channel and the slots are inclined in opposite directions and diverge toward the top of the channel. Rollers 47 are mounted in slots so that they are free to rotate and move lengthwise of the slots. The inclination of the slots is such that when the channel is tilted one of the slots will be moved downwardly toward the wheel so that the roller in the slot will come into contact with the tire of the wheel. The slot will still be inclined when the channel has been tilted to cause the roller to roll down into contact with the wheel. When the wheel is rotating in one direction it will tend to move the roller up the incline away from the periphery of the wheel so that there will be no braking effect. When the wheel rotates in the opposite direction it causes the roller to bind in the slot and exert braking pressure upon the wheel. When the channel is tilted in the opposite direction, the other slot is brought into cooperative association with the wheel and the braking action of its roller will be in the opposite direction. Viewing the device as shown in Figure 1, when the channel is tilted forwardly the wheels are free to rotate in a forward, or counter-clockwise direction but will be held against rearward or clockwise rotation.

It will be seen that if the bridle is pulled so as to lift the head of the horse the support lever 29 will be lifted about its pivot and, through link 38, shaft 40 with its respective arms and rods 42, will cause the channel to be tilted rearwardly so as to brake the wheel against forward rotation. When the bridle is released so that the head of the animal can drop down, the channels will be tilted forwardly to brake the wheels against rearward rotation. Springs 48 may be provided to hold the channels in their forwardly tilted position to permit forward motion of the device. This is the position assumed when the head of the animal is lowered.

Braking devices are also provided for the wheels on the hind legs and the channels 49 are pivotally connected, as at 50, to the upper ends of support arms 51 which rise vertically from the bottom cross member 18 of the hind leg structure. The channels are tilted by means of rods 52 which are connected to the channels and to crank arms 53 connected to the ends of a shaft 54 rotatably mounted on the lower cross member 18. Shaft 54 has an operating arm 55 connected by a cable 56 to a lever arm 57 mounted upon shaft 40 which controls the operation of the front brake mechanisms. The cable may be passed over the pivots 15 and 16 of the front and hind legs so that no force is exerted upon the brake mechanism due to movement of the legs. Due to this arrangement, movement of the support lever 29 will operate both the front and rear brakes simultaneously, and in the same direction.

To give the device a realistic appearance, the cover, previously mentioned, is used to conceal the body foundation and to make the device look like an animal. The cover 58 may be of plastic, or other suitable material, and formed so that it may be inflated to simulate the body, neck and head of an animal such as a horse, donkey, camel, elephant or other beast of burden used for riding purposes. It may be molded as a single piece, or fabricated from several pieces as desired. The body is provided with a recess 59 to fit over the body foundation. The recess is formed and proportioned to fit snugly so that the cover, when inflated, will bulge over the edges of the foundation, as shown at 60 and 61, and, in effect, clinch the cover to the foundation. A girth strap 62 may be attached to the cover and the ends buckled or otherwise fastened to securely hold the cover in place. The body will have a valve 63 for inflating.

Stirrups 64 and a saddle 65 are attached to the cover. The stirrups are attached almost directly above the pivotal point of the front legs so that the weight of the rider will impose as little torque as possible upon the legs when the rider is standing in the stirrups. It will be obvious that if desired the stirrups may be connected directly to the body foundation instead of to the cover. The saddle is located intermediate the leg pivot points so that maximum torque will be imposed upon the legs when the rider's weight is in the saddle. In operating the device a rider will mount the saddle, placing his feet in the stirrups and taking the bridle in his hands. As the head of the animal will be in its normal lowered position, the brake channels will be tilted forwardly so that they are in position to brake the wheels against rearward movement.

To set the device in motion, the rider will lift his body by rising in the stirrups and lowering it suddenly to cause an impact upon the back of the animal. When the rider rises in the stirrups, the line of force generated is at a very acute angle to the line of the front legs and the torque is slight and insufficient to appreciably actuate the spring mechanism, while the torque upon the hind legs is negligible. The downward movement of the rider exerts a force, augmented by momentum generated by the rapidity of the motion, at approximately the midpoint between the front and hind leg pivots, thereby generating a considerable torque on both the front and hind leg structures. This will cause the leg structures to swing about their pivotal connections with the body foundation, shortening the telescopic connection between the leg structure levers against the tension of the spring and causing the angular divergence between the legs to increase. This would tend to move the front legs forwardly and the rear legs rearwardly. The front legs can move forwardly as their wheels are free to rotate in a forward direction, but due to the fact that the brakes are set to prevent rearward rotation, the rear wheels will be locked against movement. Thus, all of the increased distance between the front and rear wheels, due to the increased divergence of the leg structures, will be taken up by forward motion of the front wheels. Following the impact, the rider will again lift himself in the stirrups and the spring 28 will cause the leg structures to return to their former position. During this movement there is a tendency for the front wheels to move rearwardly and the rear wheels to move forwardly. The brakes will prevent the rearward movement of the front wheels but the rear legs may freely move in a forward direction, thus moving the body of the animal forwardly. If the rider continues this up and down motion, much in the nature of posting, the horse will continue to move in a forward direction. When it is desired to stop this forward movement, the rider pulls upon the bridle which will lift the support lever 29 and through the connecting members tilt the brake channels in an opposite direction. This will prevent further forward rotation of all four wheels. If the rider will continue to hold a tight rein, so that the horse's head will be held high, he can repeat the posting movement and the horse will move in a backward direction. If he wants the horse to move forwardly again, it is only necessary to loosen the bridle so that the head can drop forward, permitting the support lever to lower and shift the brake position.

The brake mechanism for the front wheels may be operated by slightly different mechanism in order to better provide for the turning movement of the wheels in steering. In the mechanism illustrated in Figures 7 and 8 the transverse shaft 66, which takes the place of the shaft 40 previously described, will have a central lever and be connected to the link 38 and support lever 29, as in the described form. Shaft 66 will be mounted upon the front axle in suitable bearings 67 and its outer ends will be bent at right angles and downwardly to form operating levers 68. The free ends of the operating levers 68 will underlie the vertical axis of tubular king pins 69 which pivotally connect the steering knuckles 70 to the axle 71. A shaft 72 is positioned within the tubular king pins 69 and mounted for longitudinal movement. The lower end of shaft 72 rests upon the free end of the operating lever 68. Thus, when the head of the animal and support lever 29 are moved vertically shaft 66 will be rotated and shaft 72 moved longitudinally within the tubular king pin. The longitudinal movement of shaft 72 is transmitted to brake channel member 73 by means of a link 74 which is connected to the upper end of shaft 72 and the channel. Thus, the movement of the head of the animal will cause the brake channel members to tilt, as previously described. Due to the fact that the lever 68 only moves the shaft 72 forceably in an upward direction a leaf spring 75 is employed to urge the brake channel to an opposite tilted position and thereby maintain shaft 72 in constant contact with lever 68. Channel member 73 is pivotally connected to a bracket 76 which rises from the steering knuckles 70. In this form of the invention the bracket is provided with a horizontal arm 77 which overlies the top of the brake channel. Spring 75 will be fixed to the top of the brake channel and its free end will rest against the underside of the overlying bracket arm 77 to bias the channel to the desired tilted position. An adjusting screw 78 may be threaded into the arm 77 to form a seat for the spring and the tension of the spring can be varied by adjusting the screw.

While in the above one practical embodiment of the invention has been disclosed, it will be understood that the details of construction described and illustrated are merely by way of example and the invention may take other forms within the scope of the appended claims.

What is claimed is:

1. In a mechanical device simulating an animal, a body foundation, front and hind leg structures pivoted to the body foundation near opposite ends of said body foundation, means to limit rotation of said leg structures to positions short of the vertical whereby said leg structures will at all times diverge downwardly, yieldable means to urge said leg structures toward vertical position, wheels at opposite sides of the bottoms of said leg structures, the wheels on said front leg structure being mounted for steering movement, means to turn said front wheels for steering, an inverted channel pivotally mounted over each wheel for tilting movement in the plane of the wheel, slots in the vertical webs of said channels, the slots in each web inclining downwardly toward one another, rollers mounted in said channels extending between the slots in opposite webs of the channels, and means to tilt the channels to bring either roller of each channel in contact with the peripheries of the respective wheels.

2. In a mechanical device simulating an animal as claimed in claim 1, a head and neck section movable with respect to the body foundation, said means to tilt the channels comprising a support lever lying within said head and neck section and mounted intermediate its ends upon a horizontal pivot for vertical movement, and means connected to the end of said support lever opposite the head end and to said channels to tilt said channels when said support lever is moved vertically.

3. In a mechanical device simulating an animal as claimed in claim 1, a head and neck section movable with respect to said body foundation, said means to tilt said channels comprising a support lever lying within said head and neck sections and mounted intermediate its ends upon a horizontal pivot for vertical movement, a shaft horizontally positioned across the front leg structure having crank arms, links connecting the channels adjacent said front wheels and said crank arms, a link connecting the end of said supporting lever opposite the head end and said shaft to rotate said shaft when said support lever is moved vertically, and means interconnecting the channels adjacent the front wheels and the channels adjacent the rear wheels to tilt the rear channels as the front channels are tilted.

4. In a mechanical device simulating an animal as claimed in claim 3, said support lever terminating in the area of the mouth of said head section and a bridle connected to the head end of said support lever, whereby the channels may be tilted by pulling upon and releasing the bridle.

5. In a mechanical device simulating an animal, a body foundation, front and hind leg structure pivoted to the body foundation near opposite ends of said body foundation, means to limit rotation of said legs to positions short of the vertical whereby said leg structures will at all times diverge downwardly, yieldable means to urge said leg structures toward vertical position, wheels at the bottom of said leg structures, stirrups suspended from a point above and substantially in line with the pivotal connection of said front leg structure to said body foundation whereby weight imposed upon said stirrups will exert little torque upon said leg structures, and a saddle mounted at a position intermediate the pivotal connections of said front and hind leg structures whereby weight upon the saddle will exert maximum torque upon the leg structures.

6. In a mechanical device as claimed in claim 5, an inflatable cover having the shape of an animal mounted upon said foundation.

7. In a mechanical device simulating an animal, a body foundation, front and hind leg structures pivoted to the body foundation near opposite ends of said body foundation, means to limit rotation of said leg structures to positions short of the vertical whereby said leg structures will at all times diverge downwardly, yieldable means to urge said leg structures toward vertical position, wheels at opposite sides of the bottoms of said leg structures, the wheels on said front leg structure being mounted for steering movement, means to turn said front wheels for steering, braking means having a position to brake said wheels against movement in one direction and shiftable to brake said wheel against movement in the opposite direction, a head and neck section movable with respect to said body foundation said means for turning said head and neck section mounted for swinging movement in a horizontal direction upon a steering post lying in the plane of the front leg structure, a tie rod connecting said front wheels, a lever arm carried by said steering post and connected to said tie rod, said supporting lever being pivoted to said steering post for movement in a vertical direction, and means shifting said braking means upon vertical movement of said supporting lever.

8. In a mechanical device simulating an animal, a body foundation, front and hind leg structures pivoted to the body foundation near opposite ends of said body foundation, means to limit rotation of said leg structures to positions short of the vertical whereby said leg structures will at all times diverge downwardly, yieldable means to urge said leg structures toward vertical position, wheels at opposite sides of the bottoms of said leg structures, the wheels on said front leg structure being mounted for steering movement, means to turn said front wheels for steering, braking means having a position to brake said wheels against movement in one direction and shiftable to brake said wheel against movement in the opposite direction, a head and neck section movable with respect to said body foundation, a supporting lever lying within said head and neck section and mounted intermediate its end upon a horizontal pivot for vertical movement and means connected to the end of said support lever opposite the head end and to said brake means to shift said brake means when said support lever is moved vertically.

9. In a mechanical device simulating an animal, a body foundation, front and hind leg structures pivoted to the body foundation near opposite ends of said body foundation, means to limit rotation of said leg structures to positions short of the vertical whereby said leg structures will at all times diverge downwardly, a yieldable means to urge said leg structures toward vertical position, wheels at opposite sides of the bottoms of said leg structures, the wheels on said front leg structure being mounted for steering movement, means to turn said front wheels for steering, braking means having a position to brake said wheels against movement in one direction and shiftable to brake said wheel against movement in the opposite direction, a head and neck section movable with respect to said body foundation, said means for turning said front wheels for steering comprising a supporting lever within said head and neck section mounted for swinging movement in a horizontal direction upon a steering post lying in the plane of the front leg structure, said wheels being mounted upon steering knuckles and pivotally connected to said front leg structure by means of king pins, a tie rod connecting said steering knuckles, and a lever arm carried by said steering post and connected to said tie rod, said supporting lever being pivoted to said steering post for movement in a vertical direction, a shaft extending horizontally across said front leg structure near the bottom thereof having rearwardly extending lever arms at its ends and a lever arm intermediate its ends, a link connecting said intermediate lever arm with the lever arm connected to said steering post, said king pins being tubular and shafts slidable within said king pins and having one end resting upon the lever arms at the ends of said horizontally extending shaft, and a link connecting the opposite ends of said slidable shafts with said braking means.

References Cited in the file of this patent

UNITED STATES PATENTS

| | | |
|---|---|---|
| 1,040,669 | Hansen | Oct. 8, 1912 |
| 1,337,479 | Loomis | Apr. 20, 1920 |
| 1,561,639 | Edgar | Nov. 17, 1925 |
| 1,651,583 | Calleson | Dec. 6, 1927 |
| 1,661,463 | Campbell | Mar. 6, 1928 |
| 2,073,726 | Bates | Mar. 16, 1937 |
| 2,526,786 | Whitney | Oct. 24, 1950 |